US011392766B2

(12) United States Patent
Kandel et al.

(10) Patent No.: US 11,392,766 B2
(45) Date of Patent: Jul. 19, 2022

(54) UNDERSTANDING AND MEDIATING AMONG DIVERSELY STRUCTURED OPERATIONAL POLICIES

(71) Applicant: CyberArk Software Ltd., Petach-Tikva (IL)

(72) Inventors: Tal Kandel, Petach-Tikva (IL); Lavi Lazarovitz, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/801,984

(22) Filed: Feb. 26, 2020

(65) Prior Publication Data
US 2021/0264107 A1  Aug. 26, 2021

(51) Int. Cl.
*G06F 40/211* (2020.01)
*G06F 40/279* (2020.01)
*G06F 9/54* (2006.01)

(52) U.S. Cl.
CPC ............ *G06F 40/211* (2020.01); *G06F 9/547* (2013.01); *G06F 40/279* (2020.01)

(58) Field of Classification Search
CPC ................................ G06F 17/02; G06F 9/547
USPC ...................................................... 704/1–10
See application file for complete search history.

(56) References Cited

U.S. PATENT DOCUMENTS

| | | | |
|---|---|---|---|
| 8,544,098 B2 | 9/2013 | Gustave et al. | |
| 8,769,605 B2 * | 7/2014 | Kaufmann | G06F 21/335 |
| | | | 726/1 |
| 8,769,642 B1 * | 7/2014 | O'Neill | H04L 63/10 |
| | | | 726/1 |
| 9,769,208 B2 | 9/2017 | Chari | |
| 10,606,957 B1 * | 3/2020 | Good | G06F 8/42 |
| 2004/0205089 A1 | 10/2004 | Alon et al. | |
| 2004/0250112 A1 | 12/2004 | Valente et al. | |
| 2006/0094400 A1 * | 5/2006 | Beachem | H04L 63/102 |
| | | | 455/410 |

(Continued)

OTHER PUBLICATIONS

Han et al. "Automatically Constructing a Normalisation Dictionary for Microblogs". Proceedings of the 2012 Joint Conference on Empirical Methods in Natural Language Processing and Computational Natural Language Learning, pp. 421-432, Jeju Island, Korea, Jul. 12-14, 2012 (Year: 2012).*

(Continued)

*Primary Examiner* — Jesse S Pullias
(74) *Attorney, Agent, or Firm* — Finnegan, Henderson, Farabow, Garrett & Dunner LLP (57) ABSTRACT

Disclosed embodiments relate to systems and methods for automatically mediating among diversely structured operational policies. Techniques include identifying a first communication of a computing resource that is associated with an operational policy, identifying a second computing resource, determining if there is a conflict between the first communication and the second computing resource, applying a language processing protocol to the communication, normalizing the communication and policy, and generating a mediated communication. Other techniques include transmitting the mediated communication, generating a recommendation for implementing a security control on the first communication, and applying a security policy to the first communication.

19 Claims, 5 Drawing Sheets

(56) References Cited

U.S. PATENT DOCUMENTS

| | | | |
|---|---|---|---|
| 2006/0265599 A1* | 11/2006 | Kanai | H04L 63/10 |
| | | | 713/182 |
| 2007/0180441 A1* | 8/2007 | Ding | G06F 9/44552 |
| | | | 717/163 |
| 2008/0016580 A1* | 1/2008 | Dixit | G06F 21/604 |
| | | | 726/27 |
| 2008/0017722 A1 | 1/2008 | Snyder et al. | |
| 2008/0177689 A1 | 7/2008 | Jeng et al. | |
| 2008/0244693 A1 | 10/2008 | Chang | |
| 2009/0006618 A1* | 1/2009 | Hayton | H04L 63/10 |
| | | | 709/225 |
| 2009/0119141 A1 | 5/2009 | McCalmont et al. | |
| 2009/0281977 A1 | 11/2009 | Allen et al. | |
| 2010/0257505 A1 | 10/2010 | Hinchey et al. | |
| 2011/0041171 A1 | 2/2011 | Burch et al. | |
| 2012/0023544 A1 | 1/2012 | Li et al. | |
| 2012/0124643 A1 | 5/2012 | Moriconi et al. | |
| 2012/0216173 A1 | 8/2012 | Liu et al. | |
| 2012/0284389 A1 | 11/2012 | Azagury et al. | |
| 2014/0115707 A1 | 4/2014 | Baily, Jr. | |
| 2014/0130119 A1* | 5/2014 | Goldschlag | H04L 63/20 |
| | | | 726/1 |
| 2015/0074746 A1* | 3/2015 | Kohno | G06F 21/34 |
| | | | 726/1 |
| 2015/0188949 A1* | 7/2015 | Mahaffey | H04W 12/0027 |
| | | | 726/1 |
| 2015/0278486 A1* | 10/2015 | Huang | H04L 63/0245 |
| | | | 726/1 |
| 2016/0212169 A1 | 7/2016 | Knjazihhin et al. | |
| 2017/0214701 A1 | 7/2017 | Hasan | |
| 2018/0069899 A1 | 8/2018 | Lang et al. | |
| 2018/0302443 A1* | 10/2018 | Weiss | G06F 21/604 |
| 2019/0171187 A1 | 6/2019 | Cella et al. | |
| 2019/0199756 A1 | 6/2019 | Correnti et al. | |
| 2019/0327271 A1 | 10/2019 | Saxena et al. | |
| 2020/0120138 A1 | 4/2020 | Sanders et al. | |
| 2020/0279041 A1 | 9/2020 | Endler | |

OTHER PUBLICATIONS

Iqbal et al. "Enabling real-time audio-video inputs for Internet of Things operational policy enforcement". Internet of Things 6 (2019) 100041 (Year: 2019).*

Niu et al., "An Improved Permission Management Scheme of Android Application Based on Machine Learning," Hindawi: Security and Communication Networks, Oct. 18, 2018, 1-12, vol. 2018.

Luan, S. et al., "Aroma: Code Recommendation via Structural Code Search," Proc. ACM Program Lang. 3, Article 152, Oct. 2019, 1-28.

Gupta, Anshul and Neel Sundaresan, "Intelligent code reviews using deep learning," KDD'18 Deep Learning Day, Aug. 2018, 1-9.

Li, J. et al., "Code Completion with Neural Attention and Pointer Networks," Chinese University of Hong Kong, 2017, 1-8.

Bhoopchand, A. et al., "Learning Python Code Suggestion with a Sparse Pointer Network," ICLR 2017, 1-11.

Raychev, V. et al., "Code Completion with Statistical Language Models," ACM, 2014, 1-10.

Kraska, T. et al., "The Case for Learned Index Structures," Cornell University, Dec. 2017, 1-27.

Cummins, C. et al., "End-to-end Deep Learning of Optimization Heuristics," IEEE, 2017, 1-14.

Bunel, R., et al., "Learning to Superoptimize Programs," ICLR 2017, 1-14.

Chua, Z. et al., "Neural Nets Can Learn Function Type Signatures from Binaries," Proceedings of the 26th USENIX Security Symposium, Aug. 2017, 1-19.

Bunel, R. et al., "Adaptive Neural Compilation," Cornell University, May 2016, 1-25.

Bunel, R. et al., "Learning to Superoptimive Programs," (Workshop version), NIPS NAMPI Workshop, 2016, 1-10.

Katz, O. et al, "Towards Neural Compilation," 2019, 1-18.

Chen, X. at al, "Tree-to-tree Neural Networks for Program Translation," ICLR 2018, 1-14.

Zheng, W. et al., "Code Attention; Translating Code to Comments by Exploiting Domain Features," Frontiers of Computer Science in China, 2008, 1-12.

Jiang, S. et al, "Automatically Generating Commit Messages from Diffs using Neural Machine Translation," 32nd IEEE/ACM International Conference on Automated Software Engineering, 2017, 1-12.

Barone, Antonia Valerio Miceli and Rico Sennrich, "A parallel corpus of Python functions and documentation strings for automated code documentation and code generation," University of Edinburgh, Jul. 2017, 1-5.

Loyola, P. et al., "A Neural Architecture for Generating Natural Language Descriptions from Source Code Changes," ACL 2017, 1-6.

Liu, Alex et al., "Xengine: a fast and scalable XACML policy evaluation engine" ACM SIGMETRICS Performance Evaluation Review 36.1 (2008) 265-276.

Teimourikia, Mahsa et al. "Context-based Risk-Adaptive Security Model and Run-time Conflict Analysis." 2016.

Amani, Abu Jabal et al., "Methods and tools for policy analysis", ACM Computing Surveys, ACM, New York, NY, Feb. 2019 pp. 1-35.

* cited by examiner

UNDERSTANDING AND MEDIATING AMONG DIVERSELY STRUCTURED OPERATIONAL POLICIES

BACKGROUND

Computer systems are increasingly implementing "everything as code" protocols to manage systems and their infrastructure. This is especially true in cloud computing environments, which may implement a variety of virtual machines and virtualized instances that run applications and other processes. Storing configurations, operational policies, etc. as code files is useful for automating management of systems and applications. As these techniques become more prevalent, however, problems arise. Many of the different code files used by different systems or applications rely on a unique vocabulary, syntax, and/or structure. These differences between code files make it very difficult for the files to be read and applied across platforms, or to be read by management systems designed to read and manage code across multiple platforms. Difficulties also arise with cross-platform communication when two platforms rely on a different file vocabulary, syntax, or structure.

Managing these code files is especially important in the context of operational or security policies that define permissions associated with an identity (e.g., user, account, virtual instance, application, etc.). Policies assigning an unnecessarily large scope of permissions may present an unnecessarily large attack surface for malicious entities to exploit. Thus, dynamically managing policies and their associated permissions is an important part of system security. Some existing schemes rely on analysis of prior user behavior or application activity to manage policies. Such schemes, however, do not permit preemptive management of the policy code files because they conduct the analysis after activity has already occurred. Thus, these systems have a heightened risk of security breaches because issues cannot be identified until after some amount of activity has occurred.

Accordingly, in view of these and other deficiencies in existing techniques, technological solutions are needed to automatically process and analyze code files associated with multiple platforms in order to manage policies in an efficient and autonomous manner. Such solutions should be able to process and analyze diversely structured policies over any platform independently and without regard to whether any activity related to the policy has already occurred. Solutions are also needed to facilitate communications between platforms that use different vocabulary, syntax, structure, etc. for their code files. It would be advantageous for such solutions to permit cross-platform sharing and implementation of policies or other code files.

SUMMARY

The disclosed embodiments describe non-transitory computer readable media, systems, and methods for automatically processing diversely structured operational policies and automatically mediating among diversely structured operational policies. For example, in an exemplary embodiment, there may be a non-transitory computer readable medium including instructions that, when executed by at least one processor, cause the at least one processor to perform operations for automatically processing diversely structured operational policies. The operations may comprise identifying a first operational policy associated with a first application or a first computer code, the first operational policy having a first vocabulary and a first syntax; identifying a second operational policy associated with a second application or a second computer code, the second operational policy having a second vocabulary and a second syntax; applying a language processing protocol to the first operational policy and the second operational policy; normalizing, based on the application of the language processing protocol, the first operational policy and the second operational policy, the normalizing including translating a specific attribute of at least one of the first operational policy or the second operational policy; and making available the normalized first operational policy and second operational policy to a computing resource configured to utilize the normalized first operational policy and second operational policy.

According to a disclosed embodiment, the computing resource may be a control application configured to perform at least one of: reading the normalized first and second operational policies, editing a selected attribute in either of the normalized first or second operational policies, or editing a selected attribute to apply to both the normalized first and second operational policies.

According to a disclosed embodiment, the computing resource may be a control application configured to perform at least one of: identifying a selected attribute in either of the first or second operational polices, identifying an inconsistency between the first and second operational policies, unifying the first and second operational policies to form a unified operational policy, or generating a report including the result of the normalizing.

According to a disclosed embodiment, the computing resource may be a control application configured to control activity associated with at least one of: the first application, the first computer code, the second application, or the second computer code.

According to a disclosed embodiment, the control application may be configured to control the activity based on a least-privilege policy.

According to a disclosed embodiment, the computing resource may be a control application configured to identify, based on the normalizing, potentially malicious activity associated with at least one of: the first application, the first computer code, the second application, or the second computer code.

According to a disclosed embodiment, the computing resource may be configured to process the normalized first operational policy and second operational policy, but is not configured to process the first operational policy and second operational policy.

According to a disclosed embodiment, the operations may further comprise identifying a set of related rules based on a result of the normalizing using a machine learning technique.

According to a disclosed embodiment, the operations may further comprise analyzing the set of related rules to determine whether either of the first operational policy or the second operational policy is associated with an identity.

According to a disclosed embodiment, the operations may further comprise analyzing the set of related rules to determine a sensitivity level of a user, an application or process identity, or an account.

According to another disclosed embodiment, a method may be implemented for automatically processing diversely structured operational policies. The method may comprise identifying a first operational policy associated with a first application or a first computer code, the first operational policy having a first vocabulary and a first syntax; identifying a second operational policy associated with a second application or a second computer code, the second operational policy having a second vocabulary and a second syntax; applying a language processing protocol to the first operational policy and the second operational policy; normalizing, based on the application of the language processing protocol, the first operational policy and the second operational policy, the normalizing including translating a specific attribute of at least one of the first operational policy or the second operational policy; and making available the normalized first operational policy and second operational policy to a computing resource configured to utilize the normalized first operational policy and second operational policy.

According to a disclosed embodiment, the method may further comprise sending a result of the normalizing to the computing resource, the computing resource being configured to control activity associated with an identity.

According to a disclosed embodiment, the computing resource may be configured to control the activity of the identity based on a least-privilege policy.

According to a disclosed embodiment, the method may further comprise identifying, based on the normalizing, potentially malicious activity associated with at least one of: the first application, the first computer code, the second application, or the second computer code.

According to a disclosed embodiment, the method may further comprise identifying, based on the normalizing, that at least one of the first or second operational policies has a rule with an unnecessarily high level of privileges.

According to a disclosed embodiment, the method may further comprise reducing the level of privileges for the rule.

According to a disclosed embodiment, reducing the level of privileges may include accessing a least-privilege policy defining a minimal scope of privileges.

According to a disclosed embodiment, the method may be performed without executing the first operational policy or the second operational policy.

According to a disclosed embodiment, the method may further comprise applying a security policy to at least one of the first operational policy or the second operational policy based on the normalizing.

According another disclosed embodiment, there may be a non-transitory computer readable medium including instructions that, when executed by at least one processor, cause the at least one processor to perform operations for automatically mediating among diversely structured operational policies. The operations may comprise identifying a first communication of a first application or a first code instance that is associated with a first operational policy, the first operational policy having a vocabulary and a syntax; applying a language processing protocol to the first communication; normalizing, based on the application of the language processing protocol, the first communication; generating a mediated communication based on the normalizing, the mediated communication including a translated attribute from the first communication that is processable by at least one of: the first application or the first code instance, or a second application or a second code instance.

According to a disclosed embodiment, the mediated communication may be an instruction for the first operational policy to take precedence over a second operational policy.

According to a disclosed embodiment, the mediated communication may be an instruction for the first application or the first code instance to take precedence over the second application or the second code instance.

According to a disclosed embodiment, the mediated communication may be transmitted to the second application.

According to a disclosed embodiment, the mediated communication may be transmitted to a control application that is configured to control the second application.

According to a disclosed embodiment, the operations may further comprise identifying a conflict among the first communication and a second communication.

According to a disclosed embodiment, the operations may further comprise identifying a conflict among the mediated communication and a second communication.

According to a disclosed embodiment, the operations may further comprise generating a recommendation for implementing a security control for the first communication.

According to a disclosed embodiment, the operations may further comprise applying a security policy for the first communication.

According to a disclosed embodiment, the security policy may be a least-privilege security policy.

According to another disclosed embodiment, a method may be implemented for automatically mediating among diversely structured operational policies. The method may comprise identifying a first communication of a first application or a first code instance that is associated with a first operational policy, the first operational policy having a vocabulary and a syntax; applying a language processing protocol to the first communication; normalizing, based on the application of the language processing protocol, the first communication; generating a mediated communication based on the normalizing, the mediated communication including a translated attribute from the first communication that is processable by at least one of: the first application or the first code instance, or a second application or a second code instance.

According to a disclosed embodiment, the method may be performed without executing the first operational policy.

According to a disclosed embodiment, the translated attribute may be based on a translated portion of the vocabulary or syntax.

According to a disclosed embodiment, the translated attribute may be a rule defined by a condition and an action.

According to a disclosed embodiment, the method may further comprise sending the mediated communication to a control application.

According to a disclosed embodiment, the control application may be configured to control activity of an identity.

According to a disclosed embodiment, the control application may be configured to identify anomalous or potentially malicious actions.

According to a disclosed embodiment, the control application may be configured to transmit the first communication to the second application.

According to a disclosed embodiment, normalizing the first communication may include modifying the first communication to adhere to a reference vocabulary or a reference syntax.

According to a disclosed embodiment, the reference vocabulary and the reference syntax may be developed based on the language processing protocol.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Modern computing systems may implement "everything as code" strategies to facilitate autonomous management of a system's security and infrastructure. These strategies store policies, configurations, etc. as code files, which can easily be altered to update or otherwise improve the functionality or security of the system. Code files may be stored in a variety file formats (for example, .xml, .yaml, and .json, among many others, both standardized and proprietary). These file formats often rely on different vocabularies, syntaxes, structures, etc., and are read differently. Thus, code files associated with different systems may not be readable across systems because the files may be stored in different formats.

Systems may use code files to store operational policies that define privileges associated with different users, identities, or applications. For example, permissions may grant a user access to a restricted resource or permit an application to alter data stored in a secure database. Each permission associated with a specific system increases the potential attack surface that may be exploited by a malicious entity. Thus, overly broad policies or policies granting a large scope or duration of privileges can cause an unnecessarily large security risk to a system. Accordingly, it is advantageous for policies to be managed closely in order to limit the number and scope of privileges to those which are minimally necessary to carry out authorized actions. Autonomous management of such policies is advantageous because of the number of policies and permissions that may be associated with a system. For example, a least privileges policy may be implemented that identifies and implements the minimum scope of privileges required for the system. Autonomous management, however, becomes difficult when, as discussed above, components of a system use different types of code files, vocabulary, syntax, structure, etc. for their policies. In such a situation, policies may not be compatible across the different components, and a management resource may not be able to read and analyze the policies of each component. Furthermore, it would be advantageous for a management resource to be able to analyze policies before they are even implemented to preemptively address unnecessary security risks.

In the disclosed embodiments, techniques of automatically processing diversely structured operational policies are described. Disclosed embodiments may process operational policies and normalize the policies into a standardized format to permit reading and analysis of diverse policies by a single resource. In other disclosed embodiments, techniques for automatically mediating among diversely structured operational policies are described, which may permit resources using differently structured policies to communicate. For example, even though two communicating resources may have different security polices (perhaps with conflicting rules), communications between the two resources may be efficiently carried out, and any policy conflicts may be resolved.

Reference will now be made in detail to the disclosed embodiments, examples of which are illustrated in the accompanying drawings.

Figure 1:
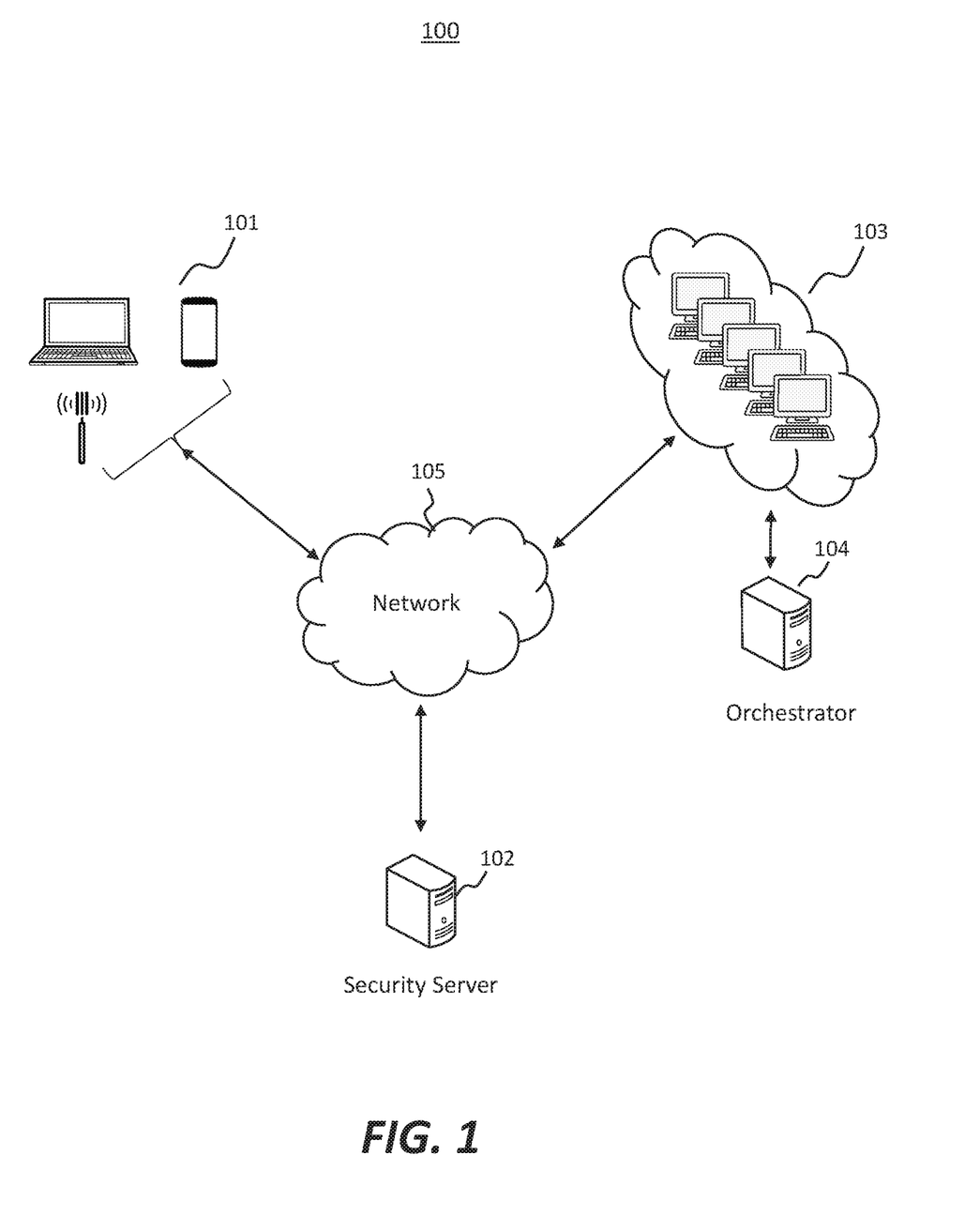
FIG. 1 is a block diagram of an exemplary system for automatically processing diversely structured operational policies in accordance with disclosed embodiments.

FIG. 1 is a block diagram of an exemplary system for automatically processing diversely structured operational policies in accordance with disclosed embodiments. System 100 may include one or more computing devices 101, one or more security server 102, a cloud computing environment 103, a cloud orchestrator 104, and a network 105 as shown in FIG. 1.

Computing device 101 may include a variety of different computing devices, including those capable of communicating over a network and those configured for short-range device-to-device communications. For example, computing device 101 may be a personal computer (e.g., a desktop or laptop), an IoT device (e.g., sensor, smart home appliance, printer, connected vehicle, industrial device, building security device, etc.), or handheld device (e.g., a mobile phone, a tablet, notebook, digital camera, etc.) as depicted in FIG. 1. Computing device 101 may also be a mainframe, a vehicle-based or aircraft-based computer, virtual machine or virtual container instance, or similar. In some embodiments, computing device 101 may be a wearable device (e.g., a smart watch, smart jewelry, an implantable device, a fitness tracker, smart clothing, a head-mounted display, etc.), ATM, or various other devices capable of processing and/or receiving data. Computing device 101 may also be a server or other network connected computing resource. In some embodiments, system 100 may include a plurality of computing devices 101, which may be of the same or different types. Computing devices 101 may communicate with each other and/or with virtual environment 103 instances through network 105, as discussed in greater detail below. Alternatively, or in addition, computing devices 101 may communicate with each other directly, for example through near-field communications (e.g., Bluetooth, infrared, RFID, light patterns, sound signals, etc.).

System 100 may also include a security server 102 as shown in FIG. 1. Security server 102 may be a proxy server or centralized server that manages the different components of system 100. In some embodiments, as described in greater detail below, security server 102 may be configured to process and manage communications among one or more computing devices 101, and/or with cloud computing environment 103. In some embodiments, security server 102 may manage security or operational policies associated with the various components of system 100 or software applications contained therein. In some embodiments, policies may be stored in one or more databases maintained by cloud orchestrator 104 or security server 102. Policies may define privileges associated with computing devices 101 or individual resources within cloud computing environment 103. Policies may be specific to a single resource. Other policies may correspond to multiple resources, applications, systems, or environments. Alternatively, or in addition, policies may define how privileges are assigned, revoked, or altered. Policies may also define the scope, strength, level, duration, etc. of privileges. Policies may be static (e.g., rules-based) or dynamic in nature. Dynamic policies may account for, for example, detected threats to system 100, anomalous or suspicious activity by resources within system 100, or other changing factors.

Security server 102 can be configured to maintain these permission policies as stored data and/or instructions (e.g., code). As a non-limiting example, the permission policies can be maintained in JSON objects, XML documents, YAML code, or according to various other formats, which may be standardized formats or more proprietary formats. In some aspects, the permission policies can be assigned to an identity associated with computing device 101 or virtual computing resources or applications within cloud computing environment 103, for example by associating a policy defining permissions with the identity. Further, in some situations the policies are assigned to groups of identities (e.g., all identities in a particular network, all identities having a common creation time, all identities having a common function or purpose, all identities having a common source or creator, etc.). In various aspects, a permission policy can be specified, referenced, or included in the definition of the identity or grouping. In some embodiments, a cloud permission policy can indicate an effect (e.g., whether the policy allows or denies an action), a list of one or more actions permitted or denied by the permission policy, or a list of one or more network resources upon which one of the listed actions can be performed.

System 100 may also include cloud computing environment 103. Cloud computing environment 103 may include one or more virtual machines or virtualized instances, which may be based on virtualization tools provided by Amazon Web Services™ (AWS™), Microsoft Azure™, IBM Cloud™, Google Cloud Platform™, Cisco Metapod™, Joyent™, vmWare™, or others. Cloud computing environment 103 may include various computing resources, storage resources, security services, developer tools, analytics tools, etc. As an example, AWS™ provides many varying cloud services including searching/analytics (e.g., CloudSearch™), virtual servers (e.g., EC2™), media services (e.g., MediaConvert™), database services (e.g., Aurora™) storage (e.g., S3™), and others. Cloud computing environment 103 may also include applications, databases, software code, files, or various other types of resources. While in some embodiments virtual resources within cloud computing environment 103 may exist entirely in the cloud, in some embodiments the virtual resources may have real-world devices that they are associated with. For example, virtual resources may be applications that run in cloud computing environment 103, but that control equipment such as a network-connected automobile, a video surveillance camera, a parking garage control station, a laptop computer, a smart home appliance, or various other IoT-type devices.

Cloud computing environment 103 may include various entities, machines, resources, or services that are associated with various policies or have various permissions. The permissions may be used by resources within cloud computing environment 103 to access other resources within cloud computing environment 103, computing device 101, security server 102, or other external computing resources. Such access may require authentication, for example, through the use of a privileged credential (e.g., password, SSH key, symmetric (e.g., public/private) key, or other type of cryptographic data or privileged access token). While cloud computing network 103 is described here as being based on virtual computing platform architecture, in some embodiments it may be in whole, or in part, based on on-premises (e.g., local corporate) networks. Accordingly, cloud computing network 103 may be entirely on-premises, entirely cloud-based, or both (e.g., hybrids). Of course, while system 100 is illustrated in FIG. 1 as including a single cloud computing environment 103, in some embodiments, there may be additional cloud computing environments. In other embodiments, system 100 may not include a cloud computing environment 103.

Cloud computing environment 103 may be in communication with cloud orchestrator 104. Orchestrator 104 may communicate with the different entities or components of cloud computing environment 103 to configure and deploy cloud computing services. In various embodiments, orchestrator 104 may be based on a variety of cloud management platforms such as AppFormix™, BMC Cloud LifeCycle Management™, IBM Cloud Orchestrator™, AWS CloudFormation™, Apache CloudStack™, Kubernetes™, or others. In some embodiments, orchestrator 104 may instantiate (e.g., spin up) instances and monitor activity in cloud computing environment 103. For example, orchestrator 104 may monitor (or control) the spinning up of new virtual instances, may provide elevated or reduced privileges to virtual instances, may request elevated or reduced privileges for virtual instances, may monitor use of privileged credentials by (or to) virtual instances, may delete or disable instances, and may perform other operations in cloud computing environment 103.

As discussed further below, the processes for automatically processing diversely structured operational policies and automatically mediating among diversely structured operational policies disclosed herein may be performed by security server 102. In alternate embodiments, computing resources 101, instances within cloud computing environment 103, or cloud orchestrator 104 may perform the disclosed processes. This may occur, for example, if security server 102 is embodied as a software agent on computing resources 101 or as a server in cloud environment 103.

Computing resources 101, security server 102, and cloud computing environment 103 may communicate with each other over a network 105. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Figure 2:
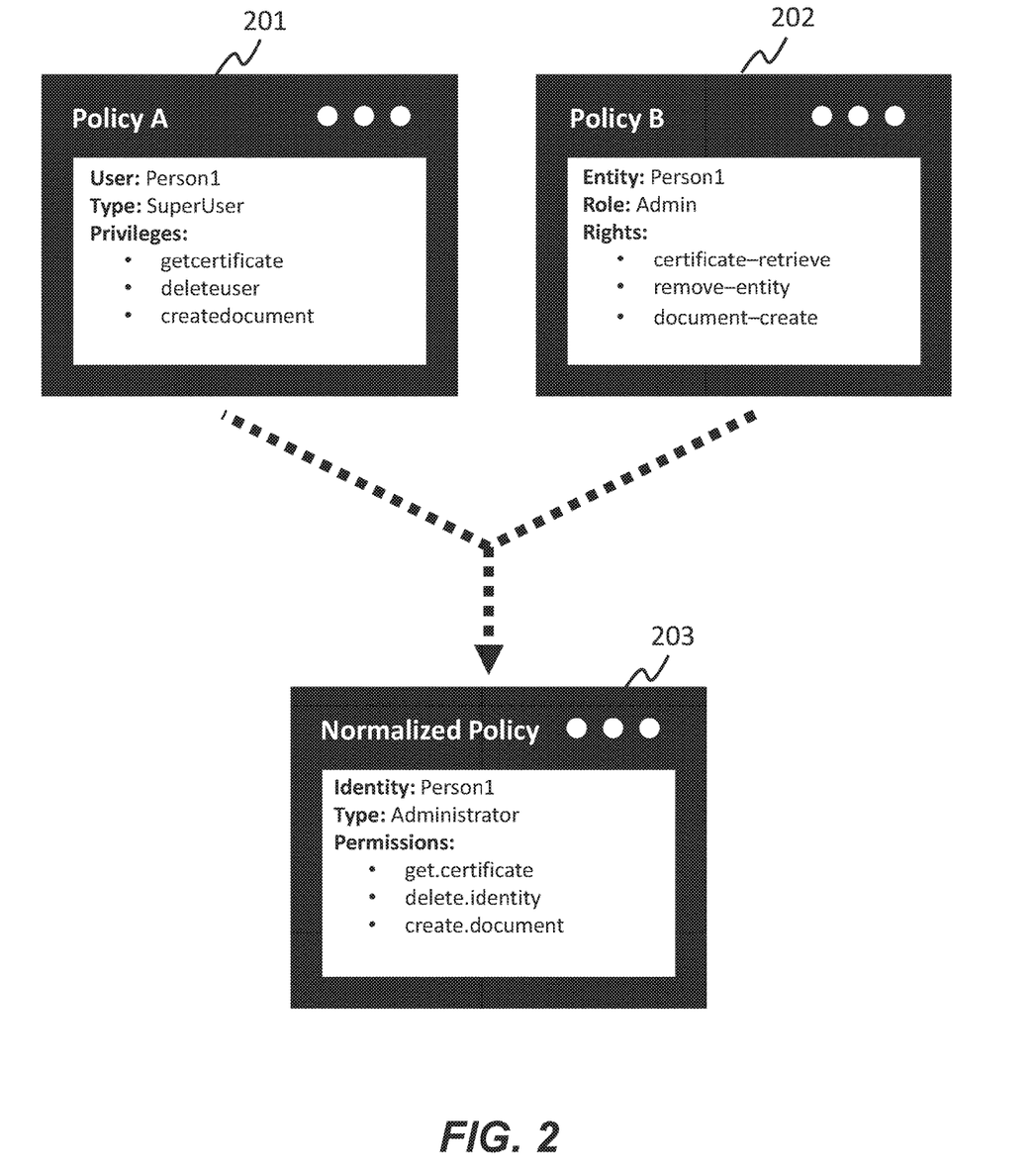
FIG. 2 is an illustration depicting exemplary policies in accordance with disclosed embodiments.

FIG. 2 is an illustration depicting exemplary policies in accordance with disclosed embodiments. As discussed above, computing device 101 and cloud computing environment 103 may be associated with permission, operational, or security policies. In some embodiments, policies may be associated with applications running on computing device 101 or cloud computing environment 103. Policies may be specific to a particular device, resource, identity, application, system, network, environment, etc. In some embodiments, policies may correspond to multiple devices, resources, identities, applications, networks, etc. Other policies may correspond to certain applications, files or file types, communications, or actions within a system. Such policies may include policies related to documents, databases, machine to machine communications, network communications, downloads, etc. Policies may provide information regarding security, operations, permissions, privileges, etc. For example, as illustrated in FIG. 2, a policy 201-203 may define privileges or permissions associated with the policy's corresponding user or identity. The permissions may correspond to one or more activities that the identity is permitted to perform with a resource. Accordingly, a policy 201-203 may also identify one or more resources associated with an activity. In some embodiments, policies may define how privileges are assigned, revoked, or altered. Policies may also define the scope, strength, level, duration, etc. of privileges. As discussed above, policies may be static (e.g., rules-based) or dynamic in nature. Dynamic policies may account for, for example, detected threats to system 100, anomalous or suspicious activity by resources within system 100, or other changing factors.

According to some embodiments, policies may also take the form of operational policies, for example Kubernetes™ configuration files. Such operational policies may identify what is to be deployed, the resource to be used for deployment and how the service is to be deployed. As an example, a Kubernetes™ configuration file may identify that an Apache™ web server is to be deployed using a certain number of pods or containers of a cloud service and specify network configuration settings or security controls to apply (e.g., identifying network ports to open or applying firewall settings).

Similarly, a policy may also be a security policy that identifies security controls to be placed on a resource. For example, a security policy may define firewall configurations defining what firewall rules should be applied, the rule priority, and what identities may be granted access through the firewall.

Policies corresponding to different computing devices 101, instances of cloud computing environment 103, applications, etc. may contain different structures, languages, vocabularies, syntaxes, file formats, or other characteristics. As an example, policies associated with a user of a smartphone may be coded differently and saved in a different file format from policies associated with a virtual instance within a cloud computing service. As another example, AWS™ policies include an "action" field and a "resource" field, while Microsoft Azure™ policies include "actions," "dataactions," and "scope" fields. In some embodiments, policies may also different in how they refer to resources, for example, AWS™ identifies resources using an Amazon Resource Name ("ARN"), while Microsoft Azure™ identifies resources using a path. FIG. 2 illustrates exemplary differences between policies. Policy 201 and policy 202 refer to two different exemplary policies having varying vocabularies and syntaxes, but including similar permissions. For example, policy 201 refers to the individual (Person1) associated with Policy A as a "user," whereas Policy B uses the term "entity." Similarly, policy A classifies Person1 as a "SuperUser" instead of an "Admin," as used by Policy B. The permissions associated with each policy also use different terms and syntax. For example, policy A uses no space between the permitted action (e.g., create) and the corresponding resource (e.g., document). Conversely, Policy B uses a hyphen between the action and the resource, in addition to placing the resource before the action.

As explained above, a system using multiple devices or resources implementing different types of policies may wish to normalize the policies for improved management and communication. Policy 203 illustrates an exemplary normalized policy format. The process used to create normalized policy 203 is discussed in greater detail below. As illustrated in FIG. 2, Policy A 201 and Policy B 202 may be converted into a normalized policy 203. Normalized policy 203 may include a normalized file format, vocabulary, syntax, structure, etc. In some embodiments, the format of normalized policy 203 may be identical to the format of one of policies 201 and 202. In other embodiments, the normalized policy 203 and its format may be unique. It is understood that although FIG. 2 depicts two policies being normalized, more than two policies may be normalized. Indeed, some systems may contain a multitude of different policies 201, 202 that may be normalized into a normalized policy format 203. In other embodiments, a single policy may be normalized into a different format. The policies and formats shown in FIG. 2 are simplified exemplary policies. It is understood that policies may be implemented using a variety of terms, actions, permissions, syntaxes, and formats.

Figure 3:
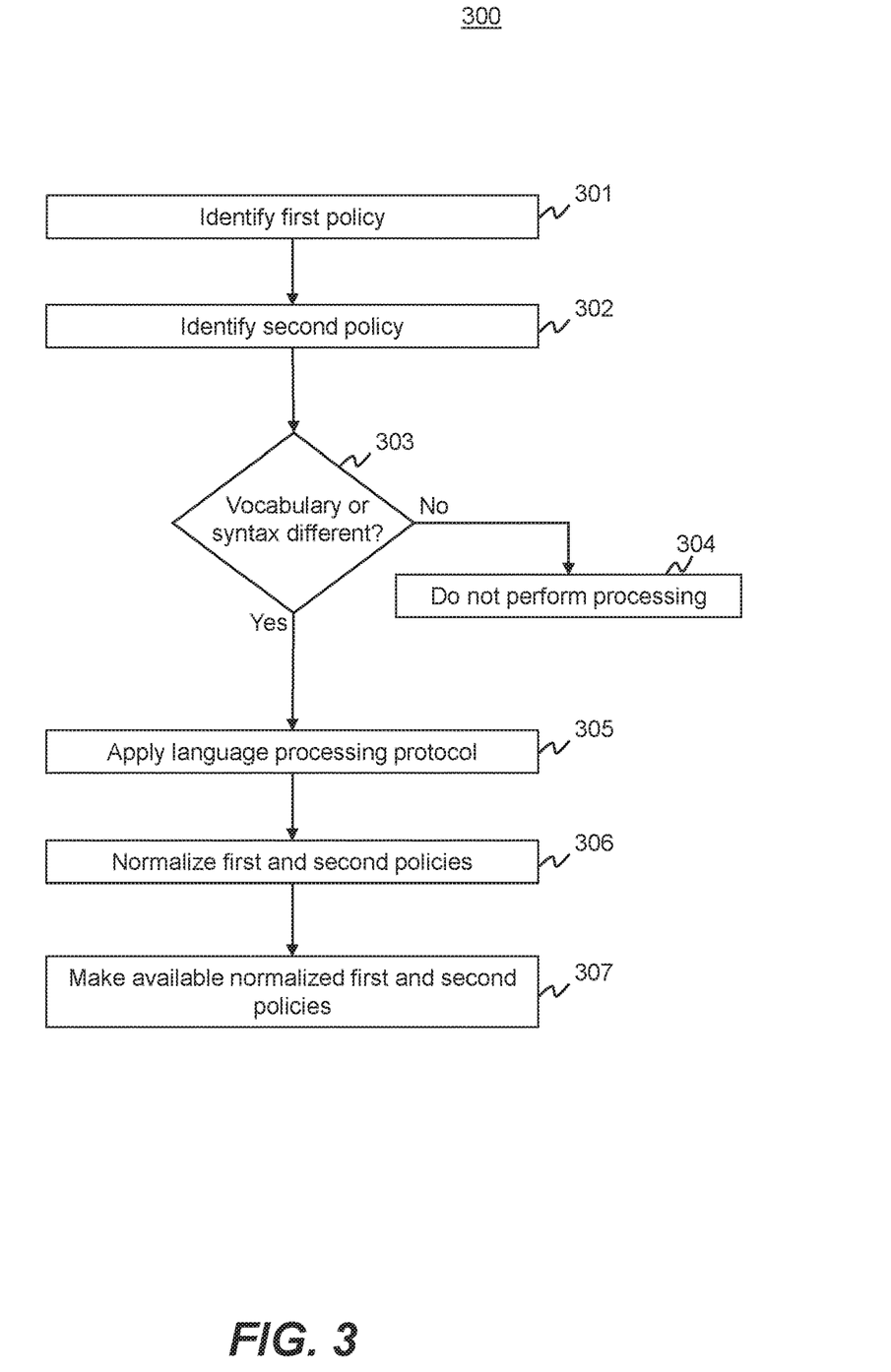
FIG. 3 is a flowchart depicting an exemplary process for automatically processing diversely structured operational policies in accordance with disclosed embodiments.

FIG. 3 is a flowchart depicting an exemplary process 300 for automatically processing diversely structured operational policies in accordance with disclosed embodiments. Process 300 may correspond to parts of FIG. 2, and accordingly descriptions of the components and processes therein may apply to process 300 as well. Process 300 may be carried out by, for example, security server 102.

At step 301, process 300 may include identifying a first policy. As discussed above, the first policy may correspond to, for example, an application, computing device 101, an instance on computing environment 103, a system, or a network. The first policy may include a first format, file type, code, language, vocabulary, syntax, etc. At step 302, process 300 may include identifying a second policy. The second policy may correspond to, for example, the same or a different application, computing device 101, instance on cloud computing environment 103, system, or network than that corresponding to the first policy.

In some embodiments, at steps 301 and 302, process 300 may include identifying first and second communications relating to policies. For example, the communications may be communications of the same or different computing devices, applications, or virtual instances. Just as policies, the communications may have corresponding formats, file types, languages, vocabularies, syntaxes, etc. that may differ between communications. In some embodiments, the communications may be associated with one or more policies.

At step 303, process 300 may include evaluating the differences between the first and second policies. The evaluation may include, but is not limited to, comparing the formats, file types, codes, languages, vocabularies, syntaxes, etc. of the first and second policies. In some embodiments, the policies may be read differently. According to some embodiments, the evaluation may be made according to a predefined similarity threshold. If the first and second policies are sufficiently similar or can be read in the same manner, process 300 may determine that further processing of the policies is not necessary at step 304. If the first and second policies are different enough to warrant further processing, process 300 may then proceed to step 305.

At step 305, process 300 may include applying a language processing tool or similar method to the first policy, the second policy, or both. The language processing tool may be used to interpret the policies and extract relevant features. The language processing may, for example, be implemented using a machine learning algorithm or natural language processing program, including, but not limited to, IBM's Watson Natural Language Understanding™, Amazon Comprehend™, and OpenNLP™ among others. In other embodiments, the language processing tool may be implemented by other text or code analytics algorithms or protocols. The language processing tool may analyze the syntax, semantics, format, vocabulary, etc. of a policy to interpret the policy and extract certain features.

An exemplary language processing algorithm may extract keywords or phrases that correspond to different elements of a policy. The keywords or phrases may be preidentified. In some embodiments, the language processing algorithm may be a machine learning algorithm that is trained using multiple policies of different syntaxes, vocabularies, etc to develop a set of keywords or phrases. In some embodiments, the language processing tool may apply a named-entity detection or term extraction method to process the policy. For example, the algorithm may process the policy by comparing each word or phrase of the policy to the set of keywords or phrases. For example, the algorithm may identify terms such as user, entity, identity, admin, administrator, policyholder, person, application, User ID, account holder, etc. as keywords that relate to the user or entity associated with the policy. When the algorithm matches a word or phrase of the policy to a keyword/phrase, the algorithm may extract the word from the policy.

As another example, the language processing protocol may implement relationship extraction. The language processing protocol may comprise a machine learning algorithm that is trained to identify relationships using a series of seed relationships that link certain terms or entities common within policies. The machine learning algorithm may then process a policy to identify and extract similar relationships of the policy and the terms within those relationships. In some embodiments, prior to relationship extraction, the machine learning protocol may annotate or tag a policy. For example, each word within a policy may be given an annotation that associates the word with a type or group of words, which may facilitate relationship extraction.

As an example, a language processing tool analyzing policy 201 of FIG. 2 may determine that the policy corresponds to a particular user, includes a classification of the type of user, and includes three permissions of varying types and relating to varying resources. The language processing tool may then extract this information from policy 201. In other embodiments, the language processing tool may be used to interpret communications identified in steps 301 and 302 and extract relevant features from the communications.

At step 306, process 300 may include normalizing the first and second policies. This normalization may occur based upon the application of the language protocol in step 305. The normalization may be implemented using a machine learning algorithm. For example, the machine learning algorithm may be used to cluster data extracted from a policy or from a communication related to a policy by the language processing protocol. In some embodiments, the language processing of step 305 and the normalization of step 306 may occur together, e.g., be performed by the same machine learning program.

Analyzing the clustered data may allow for the identification of a policy's structure or specific attributes. For example, the analysis of the clustered data may reveal whether a policy is associated with a human user or another entity's account, a sensitivity level, the nature of the policy's usage, related or associated policies, etc. The clustering will also permit identification of the various pieces of data within a policy. As an example, it may permit classification of each different type of permission within a policy and would cluster together the same types of permissions from different policies. Analysis of the clustered data would therefore permit and facilitate the creation of a normalized or unified policy format or syntax. In some embodiments, a unified policy format or syntax may be predefined. The predefined policy or syntax may be stored on, for example, security server 102. Such a predefined policy or syntax may expressly associate different terms in different policy languages (e.g., equating "SuperUser" with "Admin" and equating "getcertificate" with "certificate-retrieve"). As an example, AWS™ EC2 instances and Azure™ Virtual Machine instances may both be referred to as "instances" in their respective normalized policies. In other embodiments, step 306 may also include generating a unified policy format or syntax. Clustered data from the first and second policies may be used to create normalized first and second policies according to the unified policy format. In other words, the normalized first and second policies may be created by converting the first and second policies from their original formats into the unified or normalized policy format. The normalized first and second policies can be created such that they are able to be read and interpreted by the same application or process.

In some embodiments, the clustering process can permit identification of a set of related rules between the different policies. The related rules may permit the identification of various similar attributes between different policies. For example, the related rules may identify whether a policy is associated with a specific user or identity. As another example, the related rules may identify whether a policy is associated with an application or process identity. In some embodiments, the related rules may relate to a sensitivity level or potential threat level (e.g., a sensitivity level of a user, identity, account, permission, or policy). According to some embodiments, the related rules may also identify the type of user associated with a policy, the type of policy, the nature of the policy's usage, and other associated policies. The related rules may also be used to determine the number and type of related policies, which may include unified sets or families of policies.

At step 307, the normalized first and second policies may be made available to another computing device or resource. The normalized policies may be made available by, for example, transmitting the normalized policies through a wired or wireless connection or over network 105. In some embodiments, the normalized policies may be made available for download or retrieval by other devices or applications. For example, security server 102 may send the normalized first and second policies to computing device 101 or other computing devices. In other embodiments, security server 102 may send the normalized first and second policies to orchestrator 104. In some embodiments, the normalized policies may be saved locally to security server 102 or in a connected database such that security server 102 could later access the normalized policies. In some embodiments, the computing device or resource may be configured to process the normalized first and second policies and not to process the first and second policies. The computing resource may also be configured to control the activity of an identity, for example by implementing a least-privilege security policy.

According to some embodiments, the normalized policies may be made available to another device or application, for example a control application. The control application may be configured to control activity of system 100, computing device 101, computing environment 103, other applications or processes, etc. The control application may be executed on security server 102. In other embodiments, the control application may be executed within computing environment 103, computing device 101, orchestrator 104, or another computing device or server associated with system 100. The control application can be configured to read or process the normalized policies to assess and address security risks associated with the policies. In some embodiments, the control application may analyze policies to determine whether the policies contain exceptions, anomalies, or conflicts that may present security risks, for example by comparing the policies to other pre-identified policies. The control application may identify and monitor malicious activity associated with a policy or its corresponding identity, application, code, etc. According to some embodiments, the control application may automatically identify and address potential security issues. As an example, the control application may have the ability to revoke a highly sensitive unused permission from an identity should the control application determine that the permission presents a high security risk. As another example, a policy that the control application determines is malicious or suspicious may be suspended. In some embodiments, the control application may analyze the potential actions or ramifications of the policy before the policy is actually implemented and address any risks preemptively.

The control application may present a unified view to a user that represents all, or a subset of, the policies across one or more resources or platforms. Such a unified view can provide a single interface for a user to manage policies of multiple resources or platforms. The control application may also permit a user to define a policy to be applied across multiple platforms at once. The user could define such a policy, then the system may translate the policy back to the individual format or syntax of a specific platform or resource. This translation may occur by reversing the normalization of step 306.

In other embodiments, the control application may identify security risks or potential security risks and provide recommendations for addressing the risks. A human user or another application may then review the recommendations and determine a course of action. For example, the control application may determine that a policy includes a rule with an unnecessarily high level of privileges, which exposes the corresponding system or resource to an unnecessarily high attack potential. In such an instance, the control application can recommend that the level of privileges be reduced.

In some embodiments, the control application may apply a security policy to a policy after analyzing its corresponding normalized policy. The security policy may be a least-privilege security policy. The least privilege security policy may define the minimum scope of necessary permissions associated with a certain identity, application, process, etc. The least-privilege security policy may also define that all extraneous permissions should reduced or revoked. For example, unnecessarily strong privileges, or those granted for too long a time, may be eliminated. Such a least-privilege policy can increase the security of a system by reducing the number of unused permissions and thereby reducing the potential attack surface of the system. In some embodiments, the control application may select a specific attribute to edit within a normalized policy. For example, the attribute may be a scope of privileges, privileges associated with a specific identity, a type of privilege, or a specific privilege. As another example, after analyzing normalized policies associated with multiple resources or platforms, the control application may apply a security policy across all of the resources or platforms (e.g., a security policy requiring that any entity using a policy permitting access to sensitive data should be verified with two factor authentication).

In some embodiments, the control application may compare the normalized first and second operational policies. The comparison may identify an inconsistency between the policies. In some embodiments, any such inconsistencies may be reconciled and the policies may be combined to form a single unified policy. In other embodiments, policies without inconsistencies may be combined to form a single unified policy.

In some embodiments, the control application may generate a report that includes the result of the normalizing of the first and second policies. Alternatively or additionally, the report may include information about the policies, for example, attributes of a policy that were not readily normalized or not falling into a predefined classification, users/identities/applications associated with the policy, nature of the policy's usage, security risks, sensitivity levels, associated policies, recommendations related to the policy, or whether the policy is suspicious, malicious, or otherwise noncompliant with system standards.

In some embodiments, process 300 may further comprise identifying potentially malicious activity associated with the first or second policies or their corresponding resources. This identification may be made based on the normalizing conducting in step 306. As discussed above with respect to the control application, identification of such activity may permit action to be taken to mitigate any potential damage caused by the activity. In further embodiments, process 300 may also include identifying that the first or second policies include a provision with an unnecessarily high level of privileges. This identification may be made based on the normalizing conducting in step 306. Process 300 may then also include reducing the level of privileges for the provision. The reduction in privileges may be made according to a least-privilege security policy.

Process 300 may be performed without executing the first policy or second policy. Normalization of the policies without execution may limit attack exposure to a system implementing process 300 because the policies can then be analyzed, and potentially altered, before they are executed. Similarly, process 300 may also include applying a security policy to one or both of the first and second policies based on the normalizing. For example, a security policy may be applied to the first policy if, after it is normalized, security server 102 determines that the first policy is overly permissive or potentially malicious.

Figure 4:
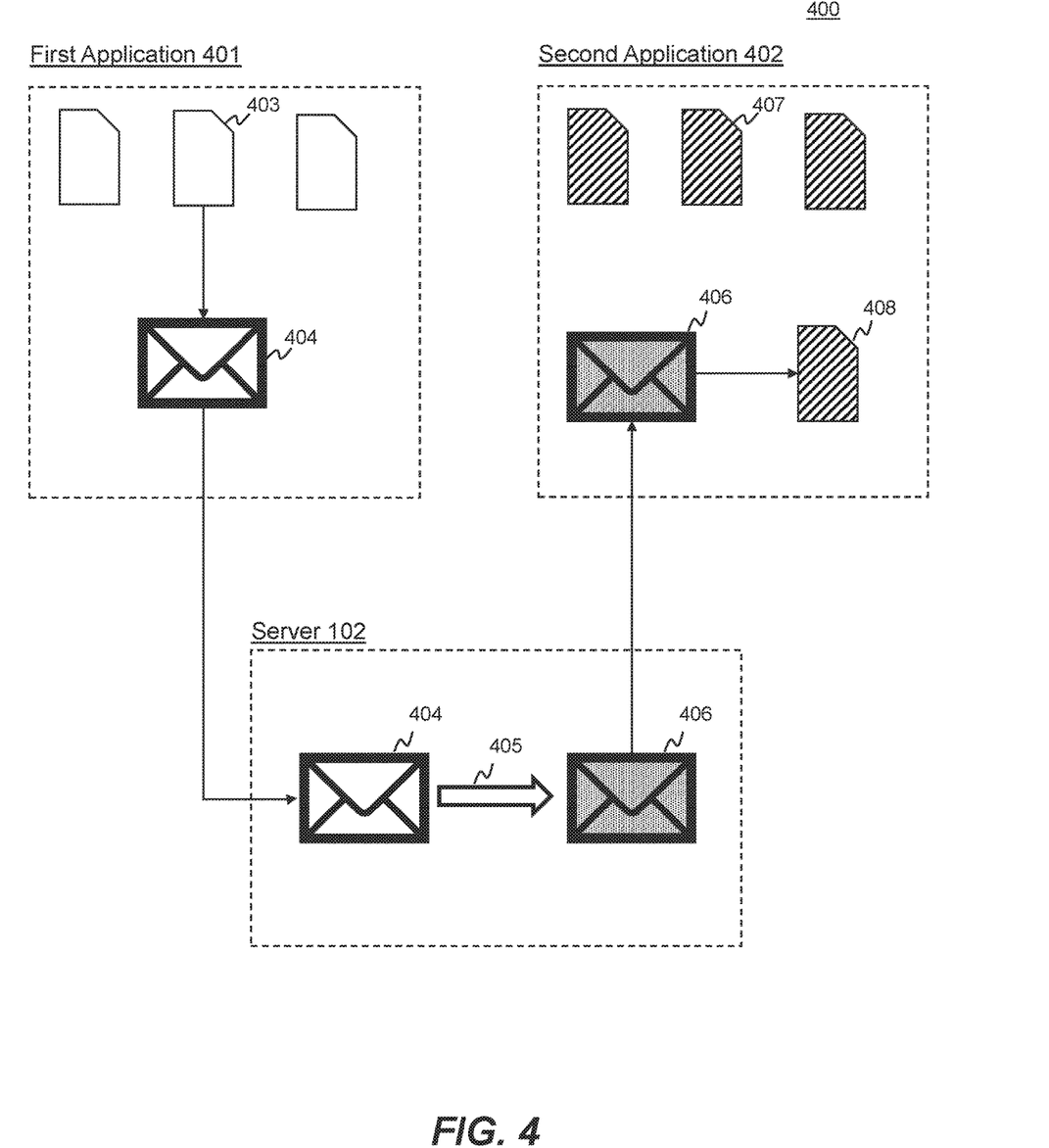
FIG. 4 is block diagram depicting an exemplary process for automatically mediating among diversely structured operational in accordance with disclosed embodiments.

FIG. 4 is block diagram depicting an exemplary process 400 for automatically mediating among diversely structured operational policies in accordance with disclosed embodiments. Mediating among diversely structured operational policies using process 400 permits, for example, applications using different policy syntaxes to communicate and share policies effectively. As depicted in FIG. 4, process 400 may be used to facilitate communication between two software applications, for example applications being executed with computing environment 103. Process 400 may also be used to facilitate other communications, for example, those between multiple computing devices 101, a computing device 101 and computing environment 103, different virtual instances within computing environment 103, or security server 102 and computing device 101 or computing environment 103. Process 400 may be triggered in response to a request by second application 402 for information from first application 401. Process 400 may also be triggered by a transmission by first application 401. In other embodiments, process 400 may be initiated by security server 102.

First application 401 may have one more operational policies 403 associated with it. Operational policy 403 may be in a syntax, vocabulary, or format readable by first application 401, but not necessarily readable by second application 402. First application 401 may generate a communication 404 associated with operational policy 403. In some embodiments, first application 401 may transmit communication 404 to security server 102. For example, the communication may be addressed (e.g., by IP address, MAC address, port number, etc.) to security server 102 but may include an identification of the second application 402 (e.g., IP address, MAC address, port number, etc.). Alternatively, security server 102 may act as a proxy server and intercept communication 404. For example, security server 102 may monitor and intercept all outgoing traffic from first application 401, or may intercept only traffic addressed to second application. Other interception techniques are possible as well.

Security server 102 may, upon receipt of communication 404, proceed to mediate the communication at step 405. The result of mediating communication 404 is mediated communication 406. The mediating process of step 405 is discussed in greater detail below with respect to FIG. 5. Mediated communication 406 may be in a format that is readable by second application 402. Mediated communication 406 may include (or be based on) a mediated policy 408 or policy attributes that are readable or processable by second application 402. Such mediated policy may be in a format or syntax of the operational policies 407 associated with second application 402.

While FIG. 4 depicts the mediation step occurring on security server 102, in some embodiments, the mediation may be executed by either first application 401 or second application 402. Process 400 may therefore occur directly between first application 401 and second application 402. Of course, as described above, process 400 may also occur directly between computing devices 101, virtual instances within computing environment 103, etc.

Figure 5:
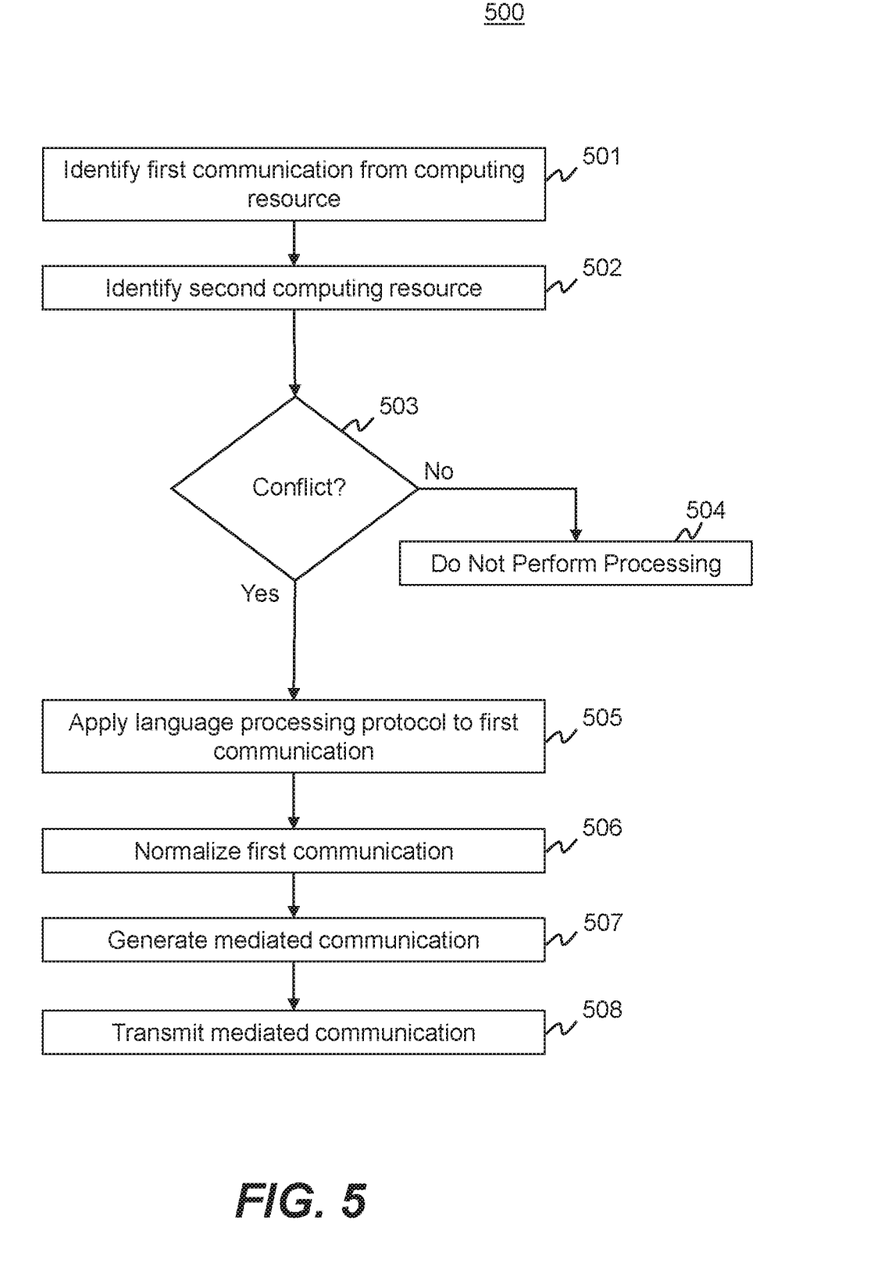
FIG. 5 is a flowchart depicting an exemplary process for automatically mediating among diversely structured operational policies in accordance with disclosed embodiments.

FIG. 5 is a flowchart depicting an exemplary process 500 for automatically mediating among diversely structured operational policies in accordance with disclosed embodiments. Process 500 may correspond to parts of FIGS. 1-4, as discussed above, and accordingly descriptions of the components and processes therein may apply to process 500 as well. Process 500 may be implemented, for example, by security server 102 or orchestrator 104. In other embodiments, as discussed in greater detail below, process 500 may be implemented by computing device 101 or by virtual instances or applications within cloud environment 103. For example, an agent running on device 101 or a server in cloud environment 103 may carry out process 500.

As described above with respect to FIG. 4, process 500 may be used to facilitate communication between two software applications, such as applications being executed in cloud environment 103. Process 500 may also be used to facilitate other communications, for example, between multiple computing devices 101, a computing device 101 and cloud environment 103, different virtual instances within cloud environment 103, or security server 102 and computing device 101 or cloud environment 103. Accordingly, process 500 may be triggered in response to a request made by one application for information from a second application. Process 500 may also be triggered by a transmission of a communication by an application or device. In other embodiments, process 500 may be initiated by security server 102.

At step 501, process 500 may include identifying a first communication of a first computing resource. In some embodiments, the first computing resource may be computing device 101. The first computing resource may also be an application or code instance executed on computing device 101 or within computing environment 103. The first communication may be associated with or contain a first operational policy. In other embodiments, the first communication itself may be an operational policy. As described above with respect to FIGS. 1-4, the policy may have a particular vocabulary or syntax and may be associated with a particular system, application, device, virtual instance, user, identity, etc.

At step 502, process 500 may include identifying a second computing resource. The second computing resource may be a second computing device 101 or a second application or code instance executed on computing device 101 or within computing environment 103. The second computing resource may be associated with policies or communications. Such corresponding communications or policies may have a particular vocabulary or syntax. The vocabulary or syntax of the second computing resource may be different from that of the first computing resource such that communications or policies corresponding to the first computing resource are not readable by the second computing resource and vice-versa. In some embodiments, this may lead to conflicts or security vulnerabilities between the two policies. Thus, the two computing resources may not be able to communicate policies effectively between each other because they cannot read or process the other resource's polices.

At step 503, process 500 may include determining if there is a conflict between the communication or policy format, syntax, vocabulary, etc. of the first and second computing resources. Determining a conflict may include evaluating the differences between communications or policies corresponding to the first and second computing resources. The evaluation may include, but is not limited to, comparing the formats, file types, codes, languages, vocabularies, syntaxes, etc. of policies corresponding to the first and second computing resources. In some embodiments, conflicts may be evaluated against a predefined threshold. For example, if the policy syntax of the first and second computing resources is not sufficiently similar to meet the threshold, a conflict may be found. If there is a conflict between the first and second computing resources, process 500 may proceed to step 505. If no conflict is found, process 500 may proceed to step 504 and not perform further processing. Further processing may not be necessary if the communication or policy syntax is the same between the first and second computing resources because the two resources will be able to read or process the other resource's policies.

In other embodiments, process 500 may include identifying a conflict between the first communication and a second communication. The second communication may be associated with the second computing resource. For example, the first computing resource may have received the second communication from the second computing resource. As discussed above, if the first and second communications are not sufficiently similar, process 500 may proceed to step 505. If the first and second communications are not in conflict, process 500 may proceed to step 504 and may not perform further processing of the first communication.

At step 505, process 500 may include applying a language processing protocol to the first communication. As discussed above with respect to FIG. 3, the language processing protocol may be used to interpret and extract relevant features from the first communication and/or its associated policy. The language processing, for example, be implemented using a machine learning algorithm or other natural language processing program, including, but not limited to, IBM's Watson Natural Language Understanding™, Amazon Comprehend™, and OpenNLP™. In other embodiments, the language processing tool may be implemented by other text or code analytics algorithms or protocols. The language processing tool may analyze the syntax, semantics, format, vocabulary, etc. of a communication or policy to interpret it and extract certain features.

At step 506, process 500 may include normalizing the first communication. The normalization may occur based on the application of the language processing protocol in step 505. The result of such normalization may be a mediated communication capable of being read or otherwise utilized by the second computing resource. Additionally or alternatively, a policy associated with the first communication may be normalized.

The normalization may also be implemented using a machine learning algorithm. For example, the machine learning algorithm may be used to cluster data extracted from a communication by the language processing protocol. Analyzing the clustered extracted data may allow for the identification of a communication's structure or specific attributes. For example, the analysis of the clustered data may reveal whether a communication is associated with a human user or another entity's account, the nature of the communication, related or associated policies, etc. The clustering may also permit identification of the various pieces of data within a communication. In some embodiments, the clustering may also be performed on a policy associated with a communication. For example, clustering may permit classification of each different type of permission within a policy. Analysis of the clustered data would therefore permit and facilitate the creation of a normalized or unified policy format or syntax.

The normalization may also comprise modifying the first communication to adhere to a reference vocabulary or reference syntax. The reference vocabulary or syntax may be predefined or may be generated based upon a vocabulary or syntax that is readable or useable by the second computing resource. In some embodiments, the reference vocabulary or syntax may be defined such that it is readable by both the first and second computing resources. The reference vocabulary or syntax may also be defined based on the language processing protocol applied in step 505. Using the classifications assigned by the clustering described above, the data from a communication or policy may be reformatted into the reference format.

At step 507, process 500 may include generating a mediated communication. The mediated communication may be created based on the normalization of the first communication of step 506. In some embodiments, the mediated communication may also contain a normalized policy, as discussed above. The mediated communication may include a translated attribute from the first communication. The translation may be such that the attribute is readable or processable by the first or second computing resource. The translation may be made according to a reference vocabulary or syntax, as discussed above. A translated attribute may be any data contained within the first communication. In some embodiments, the translated attribute may be a rule defined by a condition and an action. For example, the rule may specify that when a particular type of activity is detected (e.g., anomalous user activity, communications to blacklisted IP addresses, communications outside of a whitelist, etc.), a particular action will be applied (e.g., blocking the communication, reporting the communication to security server 102 or an auditing resource, generating an alert, etc.).

According to some embodiments, attributes may be translated such that they are readable by other platforms or services. For example, translated attributes may permit operations and security platforms to communicate to achieve improved control and security of a system. In a cloud computing environment, a new operations policy may declare deployment of a new cluster of pods including privileged containers. This new policy may be included in a mediated communication transmitted to a security platform. When the new policy is received and read by the security platform, the security platform could then deploy a set of security controls to be applied to the new cluster of pods to prevent unauthorized access to the privileged containers.

In some embodiments, the mediated communication may be instructions for the computing resource receiving or reading the mediated communication. The instructions may be instructions for the first operational policy associated with the first communication to take precedence over a second operational policy. In other embodiments, the instructions may indicate that the first computing resource (application, code instance, etc.) is to take precedence over the second computing resource (application, code instance, etc.).

At step 508, process 500 may include transmitting the mediated communication. The mediated communication may be transmitted to the second computing resource, where it may be read and/or processed. For example, if the mediated communication contains a policy, the second computing device may read and implement the policy. As discussed above with respect to FIG. 1, the transmission may occur through a hard-wired connection or wirelessly, for example, through nearfield communications (e.g., Bluetooth, infrared, RFID, light patterns, sound signals, etc.). In some embodiments, the transmission may occur over network 105. In some embodiments, if the first computing resource and second computing resource are applications on the same device, the transmission may occur within the device as a transfer of data from the first to the second application. In other embodiments, if the first and second computing resources are virtual instances within computing environment 103, the transmission may occur within computing environment 103 or be facilitated by orchestrator 104.

In some embodiments, the mediated communication may be transmitted to a control application. The control application may be configured to control activity of the first and/or second computing resources, or an identity. In some embodiments, the control application may be configured to control or monitor activity of system 100, computing device 101, computing environment 103, other applications or processes, etc. The control application may be executed on security server 102. In other embodiments, the control application may be executed within computing environment 103, computing device 101, orchestrator 104, or another computing device or server associated with system 100. The control application can be configured to read or process the mediated communication and normalized policies to assess and address security risks associated with the policies. As discussed above with respect to FIG. 3, in some embodiments, the control application may analyze policies to determine whether the policies contain exceptions or anomalies that may present security risks, for example by comparing the policies to other pre-identified policies. The control application may identify and monitor malicious activity associated with a policy or its corresponding identity, application, code, etc. According to some embodiments, the control application may automatically identify and address potential security issues. As an example, the control application may have the ability to revoke a highly sensitive unused permission from an identity should the control application determine that the permission presents a high security risk. As another example, a policy that the control application determines is malicious or suspicious may be suspended. In some embodiments, the control application may analyze the potential actions or ramifications of the communication or policy and address any risks preemptively.

The control application may also be configured to identify actions that are potentially malicious, unusual, or otherwise anomalous. In some embodiments, the control application may identify security risks or potential security risks and provide recommendations for addressing the risks. An application or human user may then review the recommendations and determine a course of action. For example, the control application may determine that a policy includes a rule with an unnecessarily high level of privileges, which exposes the corresponding system or resource to an unnecessarily high attack potential. In such an instance, the control application can recommend that the level of privileges be reduced.

In some embodiments, the control application may apply a security policy to a policy after analyzing its corresponding normalized policy. The security policy may be a least privilege security policy. The least privilege security policy may define the minimum scope of necessary permissions associated with a certain identity, application, process, etc. The least privilege security policy may also define that all extraneous permissions should reduced or revoked. Such a least privilege policy can increase the security of a system by reducing the number of unused permissions, or their duration, and thereby reduce the potential attack surface of the system. In some embodiments, the control application may select a specific attribute to edit within a normalized policy. For example, the attribute may be a scope of privileges, privileges associated with a specific identity, a type of privilege, or a specific privilege.

In some embodiments, the control application may generate a report that includes the result of mediating of the first communication. Alternatively or additionally, the report may include information about the data within the first or mediated communication, or about a policy associated with the communication. This may include, for example, any aspects of a communication that were not readily normalized or mediated, attributes of a policy that were not readily normalized or not falling into predefined classification, users/identities/applications associated with the policy, nature of the policy's usage, security risks, sensitivity levels, associated policies, recommendations related to the policy, or whether the communication or policy is suspicious, malicious, or otherwise noncompliant with system standards.

In some embodiments, the control application may be configured to transmit the first communication or the mediated communication to the second computing resource. In some embodiments, process 500 may further comprise identifying a conflict between the mediated communication and a second communication. For example, a comparison of the mediated communication and a second communication may identify an inconsistency between the communications or policies that may be contained therein. In some embodiments, any such inconsistencies may be reconciled and the communications or policies may be combined to form a single unified communication or policy. In other embodiments, communications without inconsistencies may be combined to form a single unified communication.

In some embodiments, process 500 may also include generating a recommendation for implementing a security control for the first communication. For example, the control application or another resource may determine from the mediated communication that the first communication is potentially malicious and should be subject stricter security controls. According to additional embodiments, process 500 may include applying a security policy to the first communication, for example a least privilege security policy. Furthermore, process 500 may be completed without executing an operational policy associated with the first communication. Mediation of the communication and analysis of the policy without execution of the policy may limit attack exposure to a system implementing process 500.

As mentioned above, process 500 may be executed by security server 102, which may act as an intermediary between the first and second computing resources. In other embodiments, process 500 may be performed by the first or the second computing resource, without use of an intermediary. Process 500 thus permits communication directly between computing resources using differing communication or policy vocabulary, syntax, structure, etc.

Various potential use cases of the disclosed embodiments are described below. It is understood that these cases are provided by way of example only and are not limiting of the present disclosure.

One potential implementation may be to normalize security policies associated with different devices within a system in order to manage the overall security of the system. A computing system may include a first computing device and a second computing device that have various security policies associated with different identities. The first device could have policies associated with user A, user B, and application 1. A second device could have policies associated with user A, user C, application 2, and application 3. The policies corresponding to the first device may all be defined using the same syntax and vocabulary and be stored in the same format. Likewise, the policies corresponding to the second device may all be defined using the same syntax and vocabulary, but that syntax and vocabulary may be unique from that of the first device. A system administrator may wish to analyze and monitor each of the policies autonomously, for example by using a server as a system management tool, in order to maximize the security of the system. Thus, the administrator may implement a process for automatically processing diversely structured operational policies to normalize the policies into a format that could be read and analyzed by the server.

The process may start with the server identifying a policy associated with the first device and identifying a policy associated with the second device. The server may then compare the two policies. Because the two policies are associated with the different devices, they would have different syntax and vocabulary. Thus, the server would determine that additional processing is needed, and would proceed with processing the policies using a language processing protocol. Then the polices may be normalized according to a policy format that is predefined by the server. The other policies associated with each of the computing devices may also be normalized according to the same format. The server may then analyze and compare the policies to determine if changes are needed to improve the security of the system. The server may, for example, alter the scope of privileges within one or more of the policies, if it determines that the scope or duration is too broad. The server may also combine the policies of the first and second computing device associated with User A into a single unified normalized policy.

Another potential implementation is to mediate communications between two applications being executed within a cloud computing environment. Just as the computing devices discussed in the previous example, the applications may have various security policies associated with different identities. The first application could have policies associated with user A, user B, and application 1. A second application could have policies associated with user A, user C, application 2, and application 3. The policies corresponding to the first application may all be defined using the same syntax and vocabulary and be stored in the same format. Likewise, the policies corresponding to the second application may all be defined using the same syntax and vocabulary, but that syntax and vocabulary may be unique from that of the first device.

The second application may wish to receive a policy to implement from the first application. In that case, the first application may identify or create a communication containing the policy. The first application may then send the communication, including the policy, to the cloud orchestrator. After identifying the second application as the target recipient of the communication, the orchestrator may then compare communication's policy with a policy associated with the second application. After determining that the policies are in conflict, the orchestrator may apply a language processing protocol to the communication, normalize the communication, and generate a mediated communication. The normalization and mediation may occur such that the communication and associated policy are now processable by the second application. The orchestrator may then transmit the mediated communication and policy to the second application, which may read the communication and implement the policy.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for automatically mediating among diversely structured operational policies, the operations comprising:
    identifying a first communication of a first application that is associated with a first operational policy, the first operational policy having a vocabulary and a syntax, wherein the first communication is in a format unreadable by a second application;
    identifying a conflict between the first operational policy and a second operational policy associated with the second application;
    applying a natural language processing protocol to the first communication to extract a plurality of features from the first communication;
    normalizing the first communication based on the identified conflict, the application of the natural language processing protocol, and the extracted features; and
    generating a mediated communication based on the normalized first communication, wherein the mediated communication includes a translated attribute from the first communication that is in a format readable and processable by the second application.

2. The non-transitory computer readable medium of claim 1, wherein the mediated communication is an instruction for the first operational policy to take precedence over the second operational policy.

3. The non-transitory computer readable medium of claim 1, wherein the mediated communication is an instruction for the first application or the first code instance to take precedence over the second application or the second code instance.

4. The non-transitory computer readable medium of claim 1, wherein the mediated communication is transmitted to the second application.

5. The non-transitory computer readable medium of claim 1, wherein the mediated communication is transmitted to a control application that is configured to control the second application.

6. The non-transitory computer readable medium of claim 1, wherein the mediated communication resolves the conflict between the first operational policy and the second operational policy.

7. The non-transitory computer readable medium of claim 1, wherein the operations further comprise identifying a second conflict among the mediated communication and a second communication.

8. The non-transitory computer readable medium of claim 1, wherein the operations further comprise generating a recommendation for implementing a security control for the first communication.

9. The non-transitory computer readable medium of claim 1, wherein the operations further comprise applying a security policy for the first communication.

10. The non-transitory computer readable medium of claim 9, wherein the security policy is a least-privilege security policy.

11. A computer-implemented method for automatically mediating among diversely structured operational policies, the method comprising:
- identifying a first communication of a first application that is associated with a first operational policy, the first operational policy having a vocabulary and a syntax, wherein the first communication is in a format unreadable by a second application;
- identifying a conflict between the first operational policy and a second operational policy associated with the second application;
- applying a natural language processing protocol to the first communication to extract a plurality of features from the first communication;
- normalizing the first communication based on the identified conflict, the application of the natural language processing protocol, and the extracted features; and
- generating a mediated communication based on the normalized first communication, wherein the mediated communication includes a translated attribute from the first communication that in a format readable and is processable by the second application.

12. The computer-implemented method of claim 11, wherein the translated attribute is based on a translated portion of the vocabulary or syntax.

13. The computer-implemented method of claim 11, wherein the translated attribute is a rule defined by a condition and an action.

14. The computer-implemented method of claim 11, further comprising sending the mediated communication to a control application.

15. The computer-implemented method of claim 14, wherein the control application is configured to control activity of an identity.

16. The computer-implemented method of claim 14, wherein the control application is configured to identify anomalous or potentially malicious actions.

17. The computer-implemented method of claim 14, wherein the control application is configured to transmit the first communication to the second application.

18. The computer-implemented method of claim 11, wherein normalizing the first communication includes modifying the first communication to adhere to a reference vocabulary or a reference syntax that resolves the conflict between the first operational policy and the second operational policy.

19. The computer-implemented method of claim 18, wherein the reference vocabulary and the reference syntax are developed based on the natural language processing protocol.

* * * * *